(12) United States Patent
Lee et al.

(10) Patent No.: US 9,173,232 B2
(45) Date of Patent: Oct. 27, 2015

(54) METHOD AND APPARATUS FOR TRANSMITTING/RECEIVING DATA IN WIRELESS ACCESS SYSTEM FOR SUPPORTING MULTI-RADIO ACCESS TECHNOLOGY

(75) Inventors: Eunjong Lee, Anyang-si (KR); Youngsoo Yuk, Anyang-si (KR); Heejeong Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 260 days.

(21) Appl. No.: 13/879,345

(22) PCT Filed: Oct. 14, 2011

(86) PCT No.: PCT/KR2011/007651
§ 371 (c)(1),
(2), (4) Date: Apr. 12, 2013

(87) PCT Pub. No.: WO2012/050387
PCT Pub. Date: Apr. 19, 2012

(65) Prior Publication Data
US 2013/0208662 A1 Aug. 15, 2013

Related U.S. Application Data

(60) Provisional application No. 61/392,941, filed on Oct. 14, 2010.

(51) Int. Cl.
*H04W 4/00* (2009.01)
*H04W 74/00* (2009.01)
*H04W 8/02* (2009.01)
*H04W 24/10* (2009.01)
*H04W 48/16* (2009.01)

(52) U.S. Cl.
CPC .............. *H04W 74/002* (2013.01); *H04W 8/02* (2013.01); *H04W 24/10* (2013.01); *H04W 48/16* (2013.01)

(58) Field of Classification Search
CPC ................................. H04W 8/02; H04W 88/06
USPC .......................................................... 370/328
See application file for complete search history.

(56) References Cited

U.S. PATENT DOCUMENTS

| | | | |
|---|---|---|---|
| 2009/0117891 A1* | 5/2009 | Chou | 455/423 |
| 2009/0279487 A1 | 11/2009 | Reumerman et al. | |
| 2010/0067434 A1 | 3/2010 | Siu et al. | |
| 2012/0094664 A1* | 4/2012 | Jung et al. | 455/434 |

OTHER PUBLICATIONS

Jung, et al., "Comments and Text proposal on Study Report on Hierarchical Networks", IEEE 802.16 Broadband Wireless Access Working Group, IEEE 802.16ppc-10/0062r2, Sep. 2010, 17 pages (relevant sections: 2.2, 4.2 and 5.2).

* cited by examiner

*Primary Examiner* — Mark Rinehart
*Assistant Examiner* — Matthew Hopkins
(74) *Attorney, Agent, or Firm* — Lee, Hong, Degerman, Kang & Waimey

(57) ABSTRACT

The present invention, relates to a method of a terminal transmitting/receiving data to/from first base stations for supporting a first radio access technology (RAT) and second base stations for supporting a second RAT in a wireless access system, includes performing a scanning process for at least one second base station; receiving a first message for reordering the scanning process for the at least one second base station after predetermined time; transmitting a first scanning report message indicating the result of the scanning process for the at least one second base station based on the first message; receiving a second message for ordering the connection with one second base station of the at least one second base station; performing a connecting process for the at least one second base station based on the second message; and simultaneously transmitting/receiving the data to/from the first base stations and the second base stations.

8 Claims, 9 Drawing Sheets

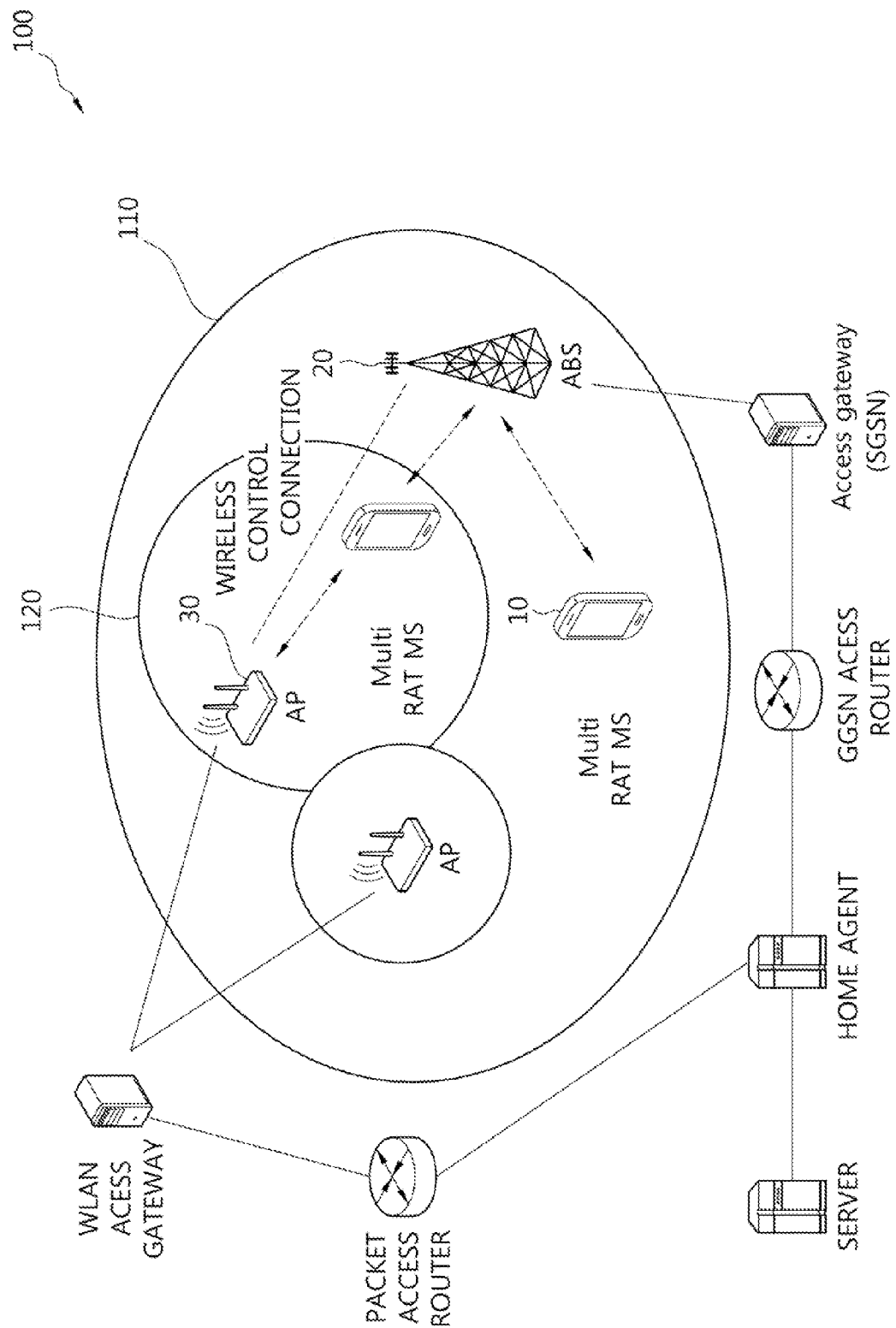

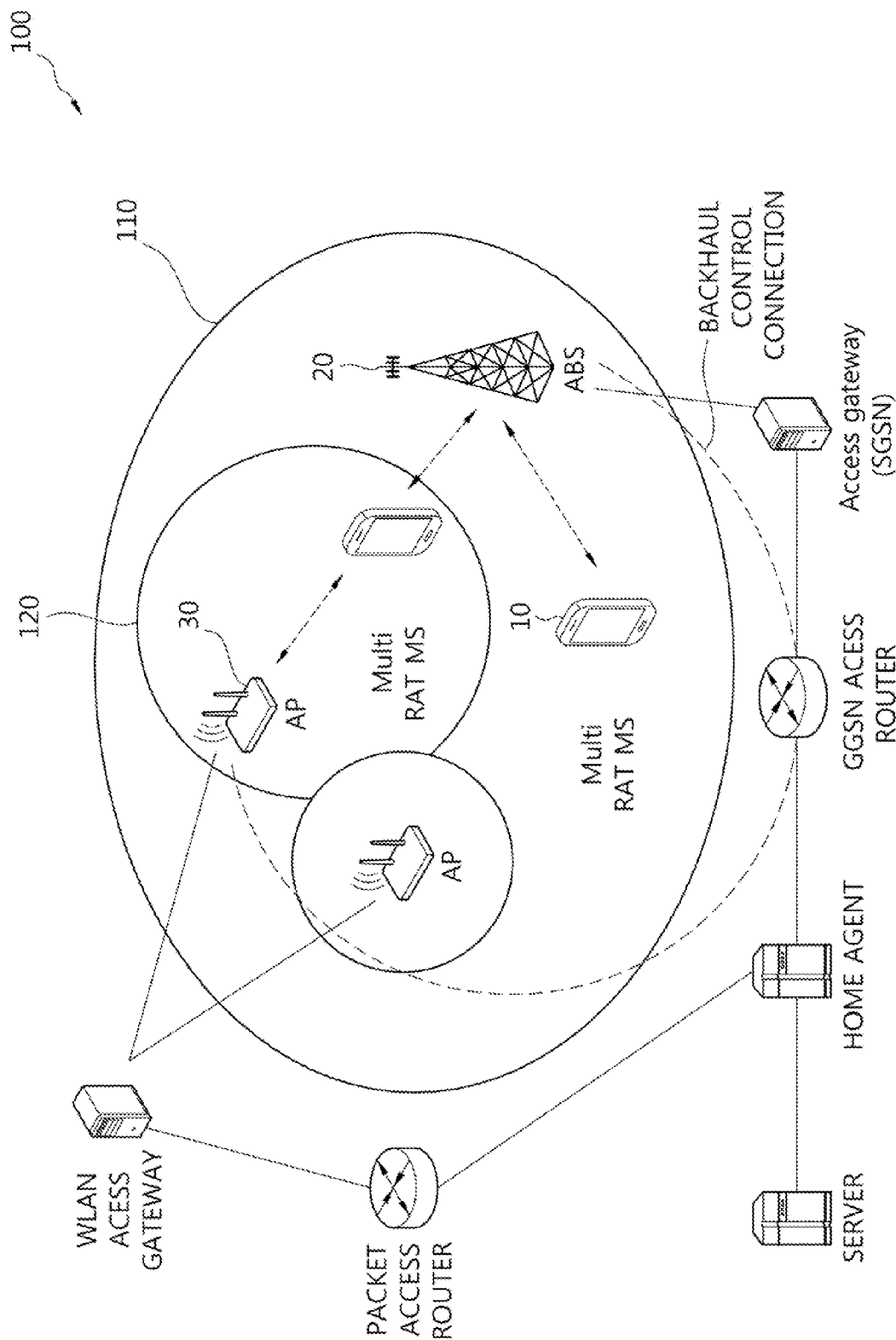

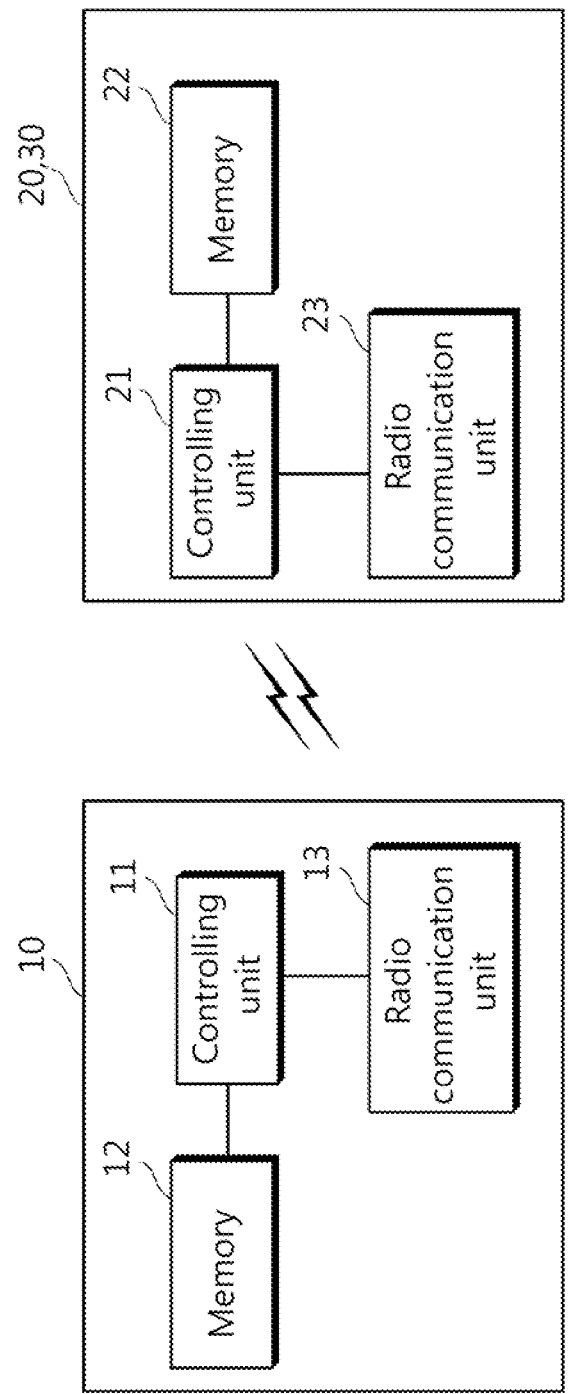

METHOD AND APPARATUS FOR TRANSMITTING/RECEIVING DATA IN WIRELESS ACCESS SYSTEM FOR SUPPORTING MULTI-RADIO ACCESS TECHNOLOGY

CROSS-REFERENCE TO RELATED APPLICATIONS

This application is the National Stage filing under 35 U.S.C. 371 of International Application No. PCT/KR2011/007651, filed on Oct. 14, 2011, which claims the benefit of U.S. Provisional Application Ser. No. 61/392,941, filed on Oct. 14, 2010, the contents of which are all hereby incorporated by reference herein in their entirety.

BACKGROUND OF THE INVENTION

1. Field of the Invention

The present invention relates to a radio access system supporting multi-radio access technology (RAT) and, more particularly, to a method and the apparatus for transmitting and receiving data over two or more heterogeneous networks.

2. Related Art

In a conventional radio communication environment supporting two or more heterogeneous networks, although a terminal has capabilities to access multi-RAT, the terminal is unable to access the multi-RAT at the same time and transmit and receive data to and from the two or more heterogeneous networks at the same time.

That is, a conventional terminal supporting multi-RAT accesses any one RAT based on switching and transmits and receives data over one network. Accordingly, if a terminal having multi-RAT capabilities transmits and receives data over a specific network and transmits and receives data over a network different from the specific network, the transmission and reception of data over any one network is stopped.

Accordingly, in the prior art, a terminal having capabilities supporting two or more heterogeneous networks is able to perform communication by using different networks, but efficiency is limited because the terminal operates based on simple switching.

Furthermore, since different networks independently operate, an inefficient operation is performed from a viewpoint of the overall flow management of a terminal For this purpose, a method by which a terminal with multi RAT capability can transmit and receive data through two or more heterogeneous networks (a first system and the second system), i.e., simultaneously through each network, has been defined.

However, it is necessary to consider the velocity of the multi-RAT mobile station (MS) when the multi-RAT MS connected to the first system tries to access simultaneously to the second system supporting a local area network.

A WLAN, which supports 802.11, is generally used to provide high rate data in narrow area. If the multi-RAT MS is moving very fast, the multi-RAT MS can pass through the narrow coverage of 802.11 quickly even though the multi-RAT MS has the ability to access both the two heterogeneous networks (e.g., 802.11/802.16). In this case, for communication of the multi-RAT MS, unnecessary second system management may be requested to the multi-RAT MS and ABS by data communication which establishes and releases connection to the system supporting 802.11.

SUMMARY OF THE INVENTION

The present invention provides a method for a multi-RAT MS to transmit and receive data with a first system and a second system by considering a velocity of the multi-RAT MS.

Especially, the present invention provides a method of carrying out rescanning on the second system (AP) to be accessed by using a specific timer when the multi-RAT MS, which transmits and receives data with the first system, tries to access the second system (AP).

Also, the present invention provides a method of transmitting average value channel status for the AP which is measured by the multi-RAT MS during a scan duration.

In an aspect, a method for a terminal to transmit and receive data with first base stations supporting a first radio access technology (RAT) and second base stations supporting a second RAT in a wireless access system supporting multi-RAT, is provided. The method includes transmitting and receiving data with the first base station, performing scanning on at least one second base station, receiving from the first station a first message reinstructing scanning on the at least one second base station after a specific time, transmitting to the first base station a first scan report message indicating a result of scanning on the at least one second base station based on the received first message, receiving from the first station a second message instructing access to one second base station among the at least one second base station, performing an access procedure to the one second base station according to the received second message, and transmitting and receiving data with the first base stations and the second base station connected through the access procedure.

Further, the performing scanning includes receiving from the first base station a third message instructing scanning on the at least one second base station included in coverage of the first base station, performing scanning on the at least one second base station based on the received third message, and transmitting to the first base station a second scan report message indicating a result of scanning on the at least one second base station.

Further, the third message may include a timer indicating information on time from the time after transmitting the second scan report message to the time of receiving the first message.

Further, the specific time may be time from the start of the timer to the expiration of the timer.

Further, The first message may be received from the first base station if a channel status value for one second base station among the at least one second base station, transmitted to the first base station through the second scan report message, satisfies a specific criteria.

Further, the second message may be received from the first base station if the channel status value for the one second base station satisfies the specific criteria again.

Further, the third message may include scan duration information indicating minimum time for scanning on the at least one second base station by the terminal Further, the scan duration information may be set on each of the at least one second base station.

Further, performing scanning on the at least one second base station may further comprise measuring an average value of channel status values of the at least one second base station according to the scan duration information.

Further, the result of scanning may be the measured average value of channel status values.

Further, the first message and the third message may be multi RAT scan command (MultiRAT_SCN-CMD) message.

In another aspect, a method for a terminal to transmit and receive data with supporting a first radio access technology (RAT) and second base stations supporting a second RAT in a wireless access system supporting multi-RAT, the operation of the method being performed by the first base station and, is provided. The method includes transmitting and receiving data with the terminal, transmitting to the terminal a first message instructing scanning on at least one second base station included in coverage of the first base station, receiving from the terminal a first scan report message indicating a result of scanning on the at least one second base station, starting a timer which indicates information on time for which the terminal waits for access to a second base station, transmitting to the terminal a second message reinstructing scanning on the at least one second base station after the timer expires, receiving from the terminal a second scan report message indicating a result of scanning on the at least one second base station, and transmitting to the terminal a third message instructing access to one second base station among the at least one second base station.

Further, the timer may start if a channel status value for the one second base station among the at least one base station, transmitted to the first base station through the second scan report message, satisfies a specific criteria.

Further, the third message may be transmitted to the terminal if the channel status value for the one second base station satisfies the specific criteria again.

In another aspect, a terminal for transmitting and receiving data with first base stations supporting a first radio access technology (RAT) and second base stations supporting a second RAT in a wireless access system supporting multi-RAT, is provided. The terminal includes a radio communication unit for transmitting and receiving a radio signal with an external devices, and a controlling unit connected to the radio communication unit, and configured for controlling the radio communication unit to receive a first message instructing scanning on at least one second base station included in coverage of the first base station, and to transmit a first scan report message indicating a result of scanning to the first base station, and controlling the radio communication unit to receive from the first base station a second message reinstructing scanning on the at least one second base station after a specific time.

Further, the controlling unit may be configured for controlling the radio communication unit to transmit to the first base station a second scan report message indicating a result of scanning the at least one of second base station based on the received second message, and to receive from the first base station a third message instructing access to one second base station among the at least one second base stations.

Further, the controlling unit may be configured for performing an access procedure to the one second base station based on the received third message, and for controlling the radio communication unit to transmit and receive data simultaneously with the first base station and with the second base station which is connected through an access procedure.

Further, the first message may further include a timer indicating time information from the time after transmitting the scan report message to the time receiving the second message.

Further, the specific time may be time from the start of the timer to the expiration of the timer.

Further, the first message may include scan duration information indicating minimum time for scanning on the second base station by the terminal Further, the controlling unit may be configured for controlling so that an average value of the channel status values of the second base station, which is measured according to the scan duration information, is reflected in a result of scanning.

The present invention provides an effect of saving unnecessary process of managing a second system for a multi-RAT MS and a first system by controlling an access procedure of the multi-RAT MS and the second system by the first system in consideration of moving velocity of the multi-RAT MS.

BRIEF DESCRIPTION OF THE DRAWINGS

FIGS. 1(a) and 1(b) are conceptual diagrams showing a multi-RAT network to which an embodiment of the present invention can be applied.

DESCRIPTION OF EXEMPLARY EMBODIMENTS

Figure 2:
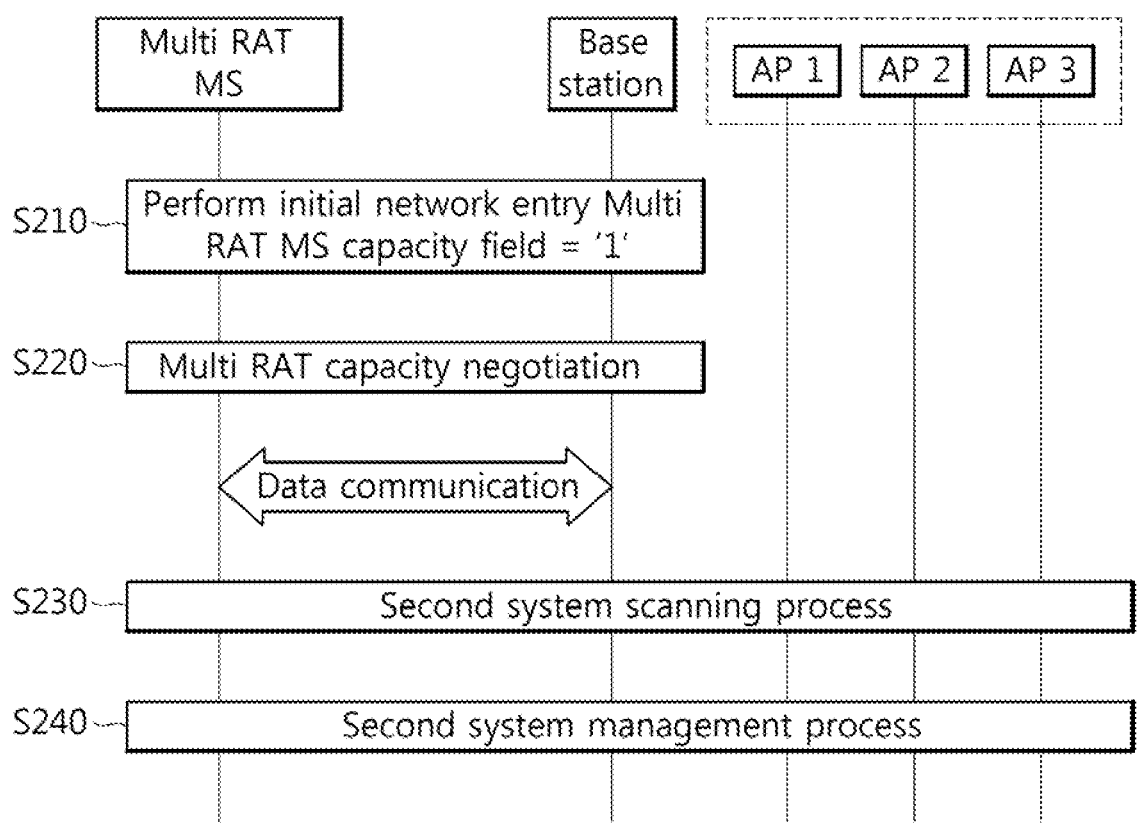
FIG. 2 is a flowchart showing a method of a multi-RAT MS transmitting and receiving data through a primary system and a secondary system.

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like.

The CDMA may be implemented as a radio technology such as universal terrestrial radio access (UTRA) or CDMA2000.The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

The UTRA is part of a universal mobile telecommunications system (UMTS).

3 GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3 GPP LTE.

Hereinafter, preferred embodiments according to the present invention are described in detail with reference to the accompanying drawings. The same or similar elements are assigned the same reference numerals irrespective of their reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

A method in which an MS accesses two or more heterogeneous networks (or multi-RAT) and transmits and receives data over the networks at the same time in a multi-RAT network according to an embodiment of the present invention is described below.

At first, a multi-radio access technology (multi-RAT) network according to an embodiment of the present invention is described.

FIGS. 1(a) and 1(b) are conceptual diagrams showing a multi-RAT network to which an embodiment of the present invention can be applied.

A multi-radio access technology (hereinafter referred to as 'multi-RAT') network refers to a radio communication environment in which two or more heterogeneous networks are present and an MS is able to access two or more heterogeneous networks and perform communication at the same time.

Here, an MS capable of performing communication with the two or more heterogeneous networks at the same time is called a 'multi-RAT MS' or 'a multi-system MS'.

A heterogeneous network (or a heterogeneous system) refers to a network using a communication method different from a communication method used in a specific network on the basis of the specific network.

For example, a WiMAX network, that is an example of a mobile communication system, and a Wi-Fi network using a Wi-Fi network, correspond to heterogeneous networks.

RAT is a technique type used in radio access. For example, RAT can include a GSM/EDGE radio access network (GERAN), a UMTS terrestrial radio access network (UTRAN), an evolved-UMTS terrestrial radio access network (E-UTRAN), WiMAX, LTE (-A), and Wi-Fi. That is, a GERAN, a UTRAN, an E-UTRAN, WiMAX, and/or Wi-Fi are mixed in the same area.

As shown in FIG. 1, a multi-RAT network 100 can include a primary system 110 and a secondary system 120.

Here, the primary system 110 and the secondary system 120 can be represented by a first network and a second network, respectively. The primary system 110 can include a multi-RAT MS 10, a base station 20, and the secondary system 120, and the secondary system 120 can include the multi-RAT MS 10 and an AP 30.

The primary system is a system having a wide range of coverage and can be a mobile communication system. For example, the primary system can be a WiMAX or LTE (-A) system. Furthermore, the primary system refers to a system always having a status with the multi-RAT MS. That is, the primary system refers to a system which maintains an activation state, a sleep mode state, or an idle mode state with the multi-RAT MS.

The secondary system is a system having a small range of coverage and can be a WLAN communication system. For example, the secondary system can be a Wi-Fi system. That is, the secondary system refers to a system that can be added to or deleted from the multi-RAT network if necessary. Furthermore, the secondary system can be used for the transmission and reception of data which basically requires a higher bandwidth (BW). Accordingly, a specific flow (QoS) can be mapped for the use of the secondary system.

Here, a base station of the secondary system, for example, an access point (AP) can operate like an MS having capabilities capable of communicating with the primary system.

Furthermore, in a multi-RAT network, the primary system and the secondary system are associated with each other in a wired or wireless manner. That is, a base station in the primary system and a base station in the secondary system can be associated with each other over a backbone network (FIG. 1(b)) can be associated with each other wirelessly (FIG. 1(a)).

Hereinafter, it is assumed that the primary system is a WiMAX system and a secondary system is a Wi-Fi system unless otherwise described, for convenience of description. Accordingly, a base station corresponding to the primary system is called a 'base station or ABS', and a base station corresponding to the secondary system is called an 'AP'. Furthermore, access to the primary system can be used as the same meaning as access to the base station or the ABS, and access to the secondary system can be used as the same meaning as access to the AP.

FIG. 2 is a flowchart showing a method of a multi-RAT MS transmitting and receiving data through a primary system and a secondary system.

Referring to FIG. 2, the multi-RAT MS performs an initial network entry process with the base station (S210).

The multi-RAT MS sends an indicator, indicating that the multi-RAT MS is an MS supporting multi-RAT, to the base station through the initial entry process with the base station. Here, the indicator can be a multi-RAT MS capability field. Furthermore, the indicator, that is, the multi-RAT MS capability field, can have a size of one bit.

Furthermore, the indicator can be transmitted through a registration procedure performed during the initial network entry process with the base station. In this case, the indicator can be transmitted to the base station through a registration request or registration response (REG-REQ/RSP) message.

For example, when the indicator is set to '1', it indicates that an MS is an MS supporting multi-RAT. When the indicator is set to '0', it indicates that an MS is an MS not supporting multi-RAT.

Furthermore, when an REG-REQ message or an REG-RSP message including the indicator (e.g., set to '1') indicative of capabilities supporting multi-RAT is received from the multi-RAT MS, the base station may send information, notifying that an additional multi-RAT capability negotiation process for supporting the multi-RAT MS will be performed, to the multi-RAT MS after the initial network entry process is finished or after a lapse of some time.

For example, when the notification information is set to '1', it indicates that the base station and the multi-RAT MS perform an additional capability negotiation process in order to support multi-RAT. When the notification information is set to '0', it indicates that an additional capability negotiation process does not need to be performed.

Next, if the multi-RAT MS finishes the initial network entry process with the base station, the multi-RAT MS and the base station perform a multi-RAT capability negotiation process (S220). Here, the multi-RAT capability negotiation process is commonly performed after a network (re)entry process is finished, but can be performed during a network (re)entry process with the base station.

For example, if the multi-RAT capability negotiation process is performed during the network (re)entry process, the multi-RAT MS and the base station can perform the multi- RAT capability negotiation process through the registration procedure process of the base station and the multi-RAT MS. In this case, the multi-RAT MS and the base station transmit and receive pieces of information regarding a multi-RAT capability negotiation through REG-REQ/REG-RSP messages.

The multi-RAT capability negotiation process of the multi-RAT MS and the primary system are described in more detail later with reference to FIG. 3.

Next, the multi-RAT MS performs an AP scanning process for access to the secondary system based on information related to the secondary system received from the base station (S230).

Here, the multi-RAT MS performs a scanning process on neighbor APs periodically or in an event-triggered way for access to the secondary system.

First, it is assumed that association with all data transmitted to the multi-RAT MS is performed through a dynamic service (DSx) procedure with the base station of the primary system and communication with the secondary system of the multi-RAT MS sends data regarding a specific flow to the secondary system under the determination of the base station of the primary system.

It is also assumed that the scanning of the secondary system of the multi-RAT MS on the APs is performed under the instruction of the base station of the secondary system. This is for the power saving of the multi-RAT MS.

The AP scanning process of the multi-RAT MS for access to the secondary system can be performed through a process of receiving a multi-RAT scan command message from the base station, performing the scanning based on the received multi-RAT scan command message, and sending a multi-RAT scan report message for reporting a result of the executed scanning to the base station.

The scanning process for access to the secondary system of the multi-RAT MS is described in detail later with reference to FIG. 4.

Next, the multi-RAT MS performs a management (or operation) procedure with the secondary system (S240). Here, the management procedure with the secondary system refers to processes, such as association, disassociation, and re-association with the secondary system of the multi-RAT MS. Here, the management procedure of the secondary system is controlled by the primary system.

After performing the association procedure with the secondary system, the multi-RAT MS transmit and receive data through the AP of the secondary system.

Here, in order to access the secondary system, the multi-RAT MS has to receive an acknowledgement response for the access to the secondary system from the primary system.

That is, as described above, the base station selects an AP that the multi-RAT MS accesses and checks the state of the selected AP before the multi-RAT MS sends the acknowledgement response to the access to the secondary system to the multi-RAT MS. If, as a result of the check, the access to the selected AP is possible, the base station can send information about the multi-RAT MS to the selected AP in advance.

Furthermore, when the base station sends a command message (SS-CMD) to the multi-RAT MS, the based station can also send information that is necessary or useful for the multi-RAT MS to access the AP.

For example, the necessary or useful information can be an SSID, the MAC address of the AP, WEP key, or channel number (or frequency information), the protocol version (11a/b/n . . . ) of the AP, and offset information between a beacon and the frames of the base station (a relative location of the beacon is indicated by a difference with a specific frame time and transmitted).

Furthermore, if the multi-RAT MS recognizes that the multi-RAT MS has entered the coverage of the secondary system as a result of the executed scanning on the AP for the access to the secondary system, the multi-RAT MS may request access to the secondary system to the base station of the primary system.

A message necessary for the management procedure of the secondary system can include the following messages.

1. A secondary system request (SS_REQ) message
: is used for the multi-RAT MS to request access to the AP.
2. A secondary system command (SS_CMD) message
: is a message used to manage access to the AP and is used for association, disassociation, or re-association with or from the AP.
3. A secondary system indication (SS_IND) message
: is a message used as a response to the secondary system command message and is used for the multi-RAT MS to inform the base station of an association success, a disassociation success, or a re-association success with the AP.

Next, if the access to the AP of the secondary system is successful, the multi-RAT MS is able to transmit and receive data to and from the primary system and transmit and receive data to and from the secondary system at the same time. Here, the data transmitted and received to and from the multi-RAT MS through the AP is controlled by the primary system.

Multi-RAT capability negotiation process

A multi-RAT capability negotiation process between the multi-RAT MS and the base station is described in detail below.

Figure 3:
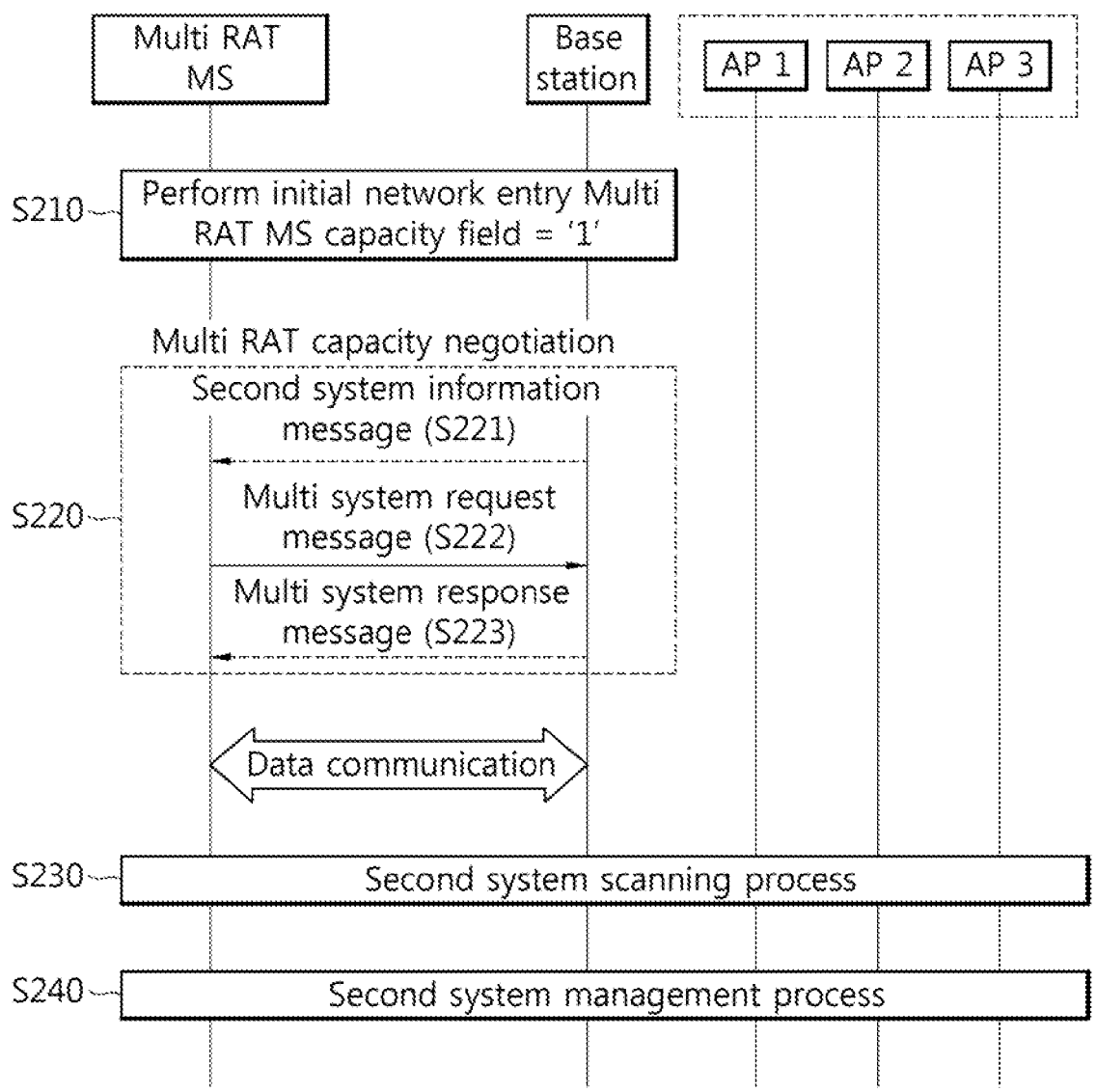
FIG. 3 is a flowchart showing a multi-RAT capability negotiation process between the multi-RAT MS and a primary system.

FIG. 3 is a flowchart showing a multi-RAT capability negotiation process between the multi-RAT MS and a primary system.

S210 and S230~S240 are the same as the contents of FIG. 2, thus a description thereof is omitted, and only a step S220 is described in detail below.

As described above, the multi-RAT capability negotiation process between the multi-RAT MS and the base station is performed after network (re)entry.

Here, in the case of the network re-entry, the multi-RAT capability negotiation process can be omitted. This is because to perform the same procedure already performed when the multi-RAT MS re-enters the same system over a network generates an unnecessary overhead because capability negotiations for multi-RAT have already been performed through the initial network entry procedure between the multi-RAT MS and the base station.

Furthermore, in the case of a handover (HO), a target base station of the primary system can perform multi-RAT capability negotiations with the multi-RAT MS in advance over a backbone network from the serving base station of the primary system.

A process of the multi-RAT MS performing the multi-RAT capability negotiation process with the primary system can be as follows.

First, the base station can send information related to the secondary system to the multi-RAT MS (S221). That is, if the base station has common information about the APs of the secondary system that have to be received by the multi-RAT MS, the base station can send the AP information to the multi-RAT MS in a broadcast or unicast way.

Here, the information related to the secondary system refers to information about a heterogeneous system that belongs to the same coverage as the primary system. Here, the multi-RAT MS may not need to know all secondary systems included in the primary system and information related to the secondary systems. In this case, the base station does not send all pieces of information about the secondary systems and related to the secondary systems, but can send a list of pieces of information related to (necessary for) the multi-RAT MS to the multi-RAT MS in a unicast way. In this case, the list can be transmitted in the multi-RAT capability negotiation process.

Next, the multi-RAT MS sends a multi-system capability request message to the base station (S222). The multi-system capability request message can include, for example, the 802.11 MAC address of the MS, existing access AP information, and protocol version information of 802.11. The 802.11MAC address is necessary for authentication information. If the existing access AP information is included in the multi-system capability request message, the multi-system capability request message is transmitted to only a base station to which the existing access AP belongs.

Next, the base station sends a multi-system capability response message to the multi-RAT MS in response to the multi-system capability request message (S223).

The multi-system capability response message can include information about candidate APs.

Furthermore, if the multi-RAT MS enters idle mode, the base station can store information, obtained through the multi-RAT capability negotiation process with the multi-RAT MS, for a certain time. That is, the base station can newly define a multi-RAT information maintenance timer, can store the obtained information until the multi-RAT information maintenance timer expires, and can discard the obtained information after the timer expires.

Accordingly, if the multi-RAT MS performs network re-entry into the base station before the multi-RAT information maintenance timer expires, the multi-RAT capability negotiation process can be omitted.

Secondary system scanning process

A scanning process on the secondary system of the multi-RAT MS is described in detail below.

Figure 4:
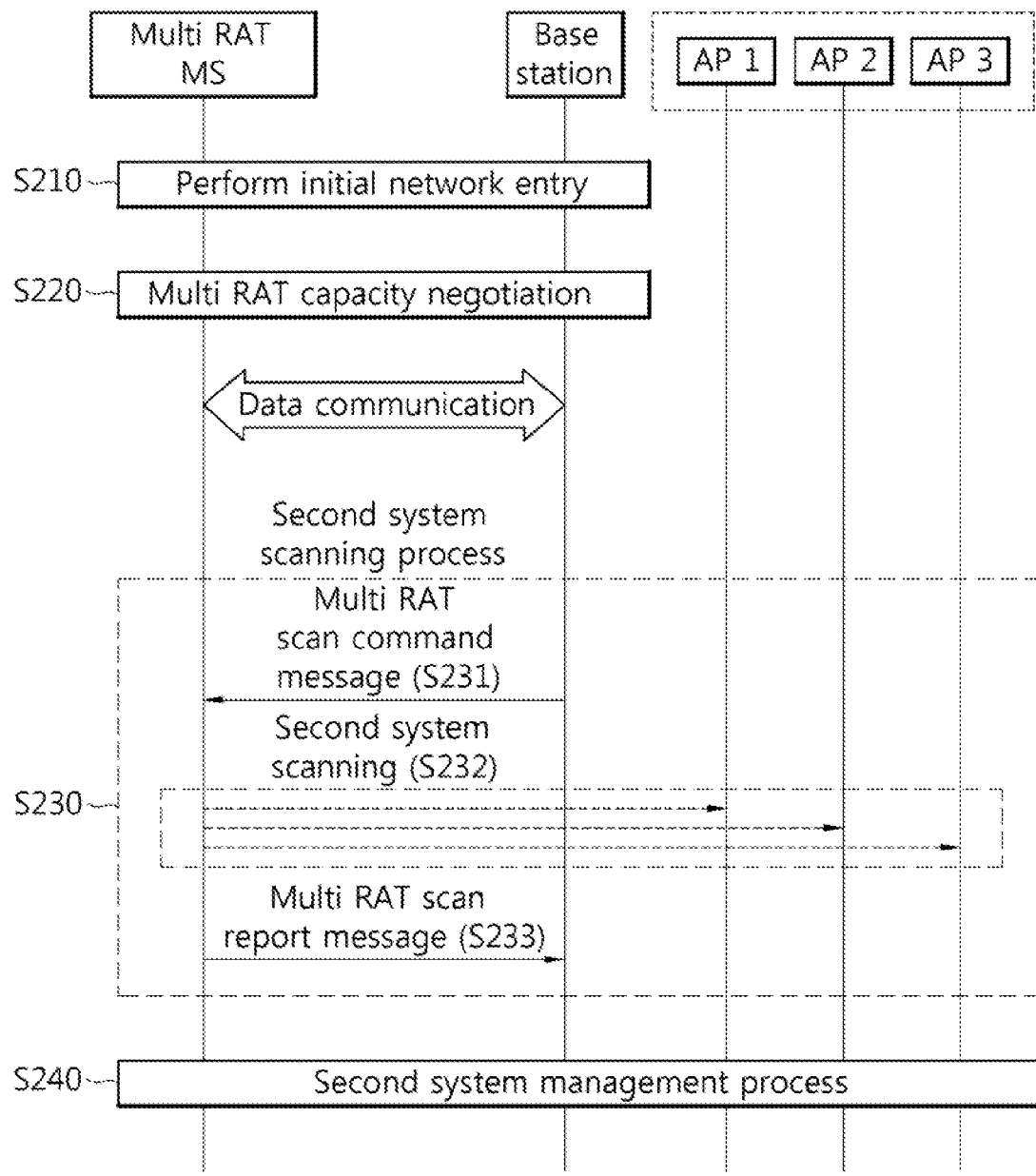
FIG. 4 is a flowchart showing a multi-RAT MS performing a scanning process on a secondary system.

FIG. 4 is a flowchart showing a multi-RAT MS performing a scanning process on a secondary system.

S210~S220 and S240 are the same as the contents of FIG. 2, thus a description thereof is omitted, and only a step S230 is described in detail below.

First, if the base station determines to communicate a specific data flow by using Wi-Fi, the base station instructs the multi-RAT MS to perform scanning on neighbor APs.

That is, the base station sends a multi-RAT scan command message (multi-RAT_SCN-CMD) to the multi-RAT MS (S231). In this case, the multi-RAT scan command message can include the SSIDs of the neighbor APs, a beacon transmission period, and scanning interval information so that the multi-RAT MS can rapidly detect the neighbor APs.

Here, the scanning of the multi-RAT MS may not be performed in response to an instruction of the base station as described above, but the multi-RAT MS may directly request scanning for access to the secondary system to the base station of the primary system. In this case, the multi-RAT MS and the base station can perform scanning on the neighbor APs through probe request/response transmission/reception processes.

Here, the multi-RAT MS performs the scanning for access to the secondary system even in a process for transmitting and receiving data with the base station of the primary system. In this case, the multi-RAT MS may indicate only an SCN-REP transmission method through the SCN-CMD message without setting a scanning interval with the base station.

That is, if the multi-RAT scan command message is received from the base station, the multi-RAT MS performs scanning on APs neighbor to the multi-RAT MS based on information included in the received multi-RAT scan command message (S232). Here, the neighbor APs of the multi-RAT MS can be the APs of the secondary system within the coverage of the base station of the primary system.

Next, the multi-RAT MS sends a multi-RAT scan report (SCN-REP) message to the base station of the primary system (S233). That is, the multi-RAT MS sends a result of the scanning into detected APs to the base station. In this case, the multi-RAT MS can also send the received signal strength indicator (RSSI) of each AP or information about APs preferred by the multi-RAT MS.

For example, if scan report mode within a multi-RAT scan command message most recently received from the base station is set to '0b10', the multi-RAT MS can send the multi-RAT scan report message to the base station in an event-triggered way.

In this case, if a scan report trigger condition is satisfied, the multi-RAT MS sends the multi-RAT scan report message to the base station.

For another example, the multi-RAT MS can report a scan result to the base station on a time defined in the multi-RAT scan command message other than a scanning interval for a periodic scan report (e.g., when report mode is set to '0b01') or for one scan report (e.g., when report mode is set to '0b11').

Furthermore, if the multi-RAT MS periodically sends a scan report to the base station, the multi-RAT MS can stop a report on scanning results for an AP after all scanning intervals within the multi-RAT scan command message.

Furthermore, the multi-RAT scan report message includes all available scanning results for requested APs defined in the multi-RAT scan command message.

In order to report a scanning result to the base station anytime or to receive a multi-RAT-neighbor advertising message having system information about a requested system and optionally system information about other RATs in which the base station is determined to be neighbor to the multi-RAT MS from the base station in a unicast way, the multi-RAT MS can send the multi-RAT scan report message to the base station.

Furthermore, the multi-RAT MS can instruct the base station to filter a list of neighbor secondary systems based on a requested radio type by including a neighbor request RAT type indicator and/or SSIDs (or BSSID or a MAC address) in the scan report message.

Next, if scanning results for a plurality of APs are received from the multi-RAT MS, that is, the multi-RAT scan report message is received, the base station can select an optimum system, that is, an AP, by taking the same operator, the priority of an MS, channel quality, load balancing, or transmitted traffic into consideration and inform the multi-RAT MS of the selected optimum system.

As another embodiment, in order to perform a scanning process on the secondary system, the multi-RAT MS can use existing transmitted and received messages instead of the multi-RAT scan command/report message defined above. Here, if the multi-RAT MS performs scanning on the secondary system by using the existing message, the existing message includes information indicating that the scanning of the multi-RAT MS is for transmitting and receiving data by using a multi-RAT system. That is, a target to be scanned by the multi-RAT MS can be indicated by newly defining a field capable of indicating the SSID, BSSID, or MAC address of a target system.

After performing the association procedure with the secondary system, the multi-RAT MS transmits and receives data to and from the secondary system. Here, association, disassociation, and re-association with the secondary system correspond to the operation (or management) process of the secondary system. Furthermore, the primary system controls the operation of the secondary system.

Here, in order to access the secondary system, the multi-RAT MS has to receive an acknowledgement response to the access to the secondary system from the primary system.

That is, as described above, the base station selects an AP that the multi-RAT MS will access and checks the state of the selected AP before the multi-RAT MS sends an acknowledgement response to the access to the secondary system. If, as a result of the check, the access to the selected AP is possible, the base station sends information about the multi-RAT MS to the selected AP in advance.

Furthermore, when the base station sends an acknowledgement response to the multi-RAT MS, the base station can also send information that is necessary or useful for the multi-RAT MS to access the AP.

For example, the necessary or useful information can be an SSID, the MAC address of the AP, WEP key, or channel number (or frequency information), the protocol version (11a/b/n . . . ) of the AP, and offset information between a beacon and the frames of the base station (a relative location of the beacon is indicated by a difference with a specific frame time and transmitted).

Furthermore, if the multi-RAT MS recognizes that the multi-RAT MS has entered the coverage of the secondary system as a result of executed scanning on the AP for the access to the secondary system, the multi-RAT MS may request access to the secondary system to the base station of the primary system.

Secondary System Management

An operation (or management) method of the secondary system is described in detail below. Here, the operation of the secondary system refers to association or disassociation between the secondary system and the multi-RAT MS and re-association between the multi-RAT MS and the secondary system, and the operation of the secondary system is controlled by the base station, that is, the primary system.

As an example of the operation method of the secondary system, a process of the multi-RAT MS accessing (or associating with) the secondary system, that is, a process of the multi-RAT MS adding the secondary system and transmitting and receiving data to and from the primary system and the secondary system at the same time, is described.

Figure 5:
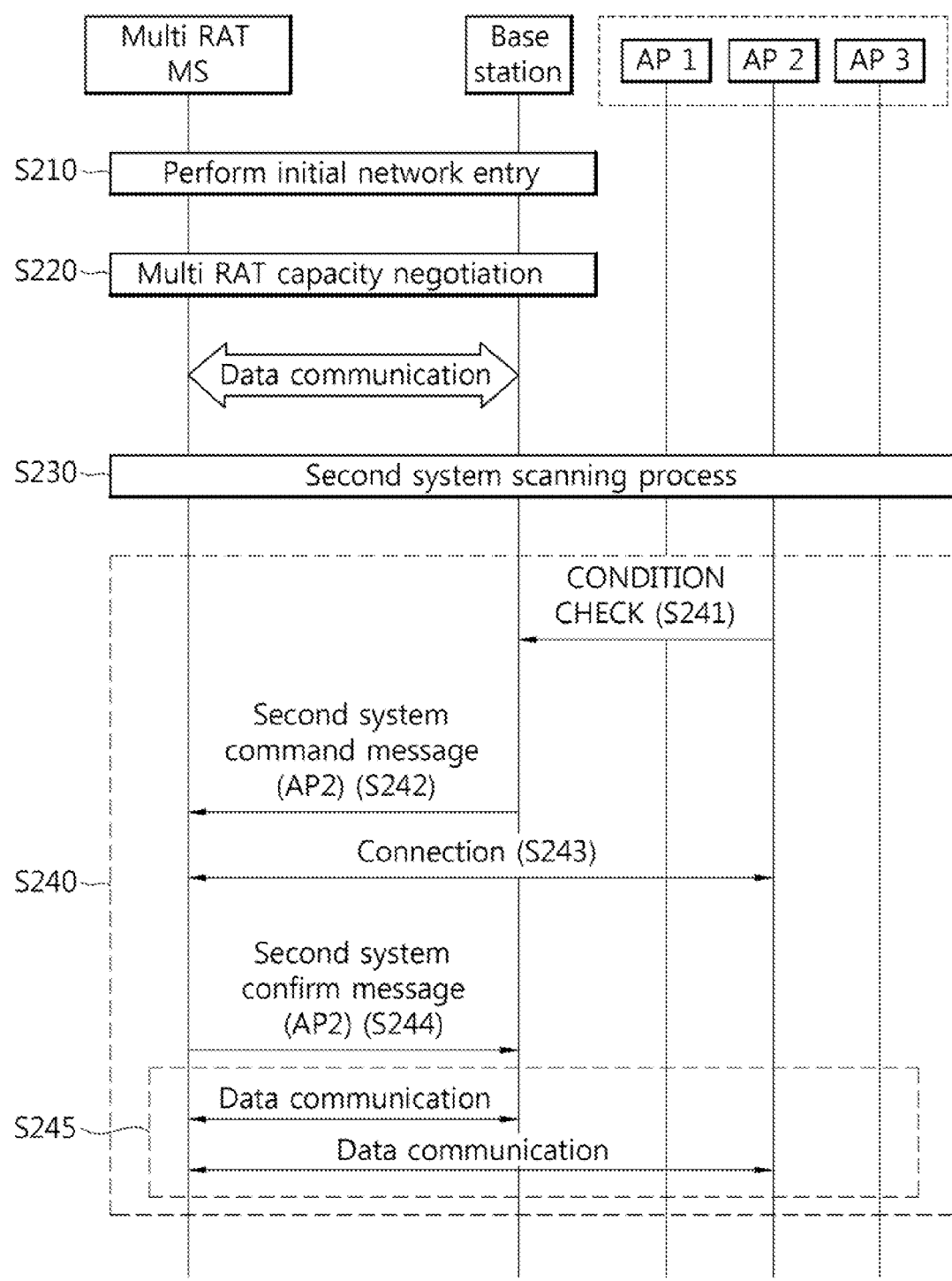
FIG. 5 is a flowchart showing a process of adding a secondary system, that is, a process of a multi-RAT MS accessing the secondary system, in an operation method of the secondary system.

FIG. 5 is a flowchart showing a process of adding a secondary system, that is, a process of a multi-RAT MS accessing the secondary system, in an operation method of the secondary system.

S210~S230 are the same as the contents of FIG. 2, thus a description thereof is omitted, and only a step S240 is described in detail below.

In order to access the secondary system, the multi-RAT MS or the base station can perform a multi-RAT association request. In this case, the multi-RAT MS or the base station can perform a multi-RAT association request process through a secondary system association request/response message.

If a secondary system is added at the request of the multi-RAT MS, when the multi-RAT MS detects the secondary system satisfying a specific condition by performing scanning, the multi-RAT MS can request association with the secondary system to the base station by sending a secondary system request message to the base station.

Furthermore, if a secondary system is added at the request of the base station, when the base station detects that specific flow association is generated in the multi-RAT MS, the base station checks the state of an AP that can be accessed to the multi-RAT MS (S241).

If, as a result of the check, access to the multi-RAT MS is possible, the base station can instruct association between the multi-RAT MS and the secondary system by sending a secondary system access command message to the multi-RAT MS (S242).

Here, control of the multi-RAT MS for accessing multi-RAT, that is, the transmission of control information, is performed by the base station of the primary system. In this case, QoS for corresponding data has only to comply with a method supported by a primary system because the multi-RAT MS simply performs data transmission and reception with the secondary system. In this case, the transmission of the control information can be performed through the secondary system access command message.

Here, the secondary system access command message can include information about a selected AP, information about a flow transmitted to the secondary system, and an authentication method (an open system or a shared key). From FIG. 5, it can be seen that information about a selected AP is an AP 2.

Next, the multi-RAT MS completes access to a specific AP and a traffic stream (TS) configuration with reference to AP information within the secondary system command message in response to an access command of the secondary system of the base station (S243). For example, an ADDTS request/response process of 802.11e can be performed.

Next, the multi-RAT MS informs the base station of a result of an association success for the specific AP (S244).

From FIG. 5, it can be seen that the multi-RAT MS informs the base station of the association success for the AP 2.

In this case, the association success can be performed through a secondary system indication (SS_IND) message. The secondary system indication message can include a result of the mapping of a flow ID (FID) and an association ID (AID)/traffic stream ID (TSID) for a corresponding flow.

Next, the multi-RAT MS transmits and receives data for a specific flow through the secondary system. That is, the multi-RAT MS transmits and receives data to and from the primary system and the secondary system at the same time according to a data flow (S245).

That is, in the case of DL data, the base station sends the DL data to the multi-RAT MS through the AP.

Furthermore, in the case of UL data, data for a specific flow ID indicated by the base station is transmitted through the secondary system, for example, over a WLAN.

Furthermore, the multi-RAT MS can perform re-association or disassociation with the AP by transmitting and receiving the secondary system command/indication messages to and from the base station.

Furthermore, if the multi-RAT MS gets out of the secondary system, for example, a WLAN coverage while transmitting and receiving data to and from the AP and there is no neighbor AP nearby, the base station can control seamless flow mobility between the AP and the base station so that the data transmitted to and received from the AP is seamlessly transmitted through the base station of the primary system.

Furthermore, if the multi-RAT MS detects a neighbor AP while transmitting and receiving data to and from the AP of the secondary system, the base station can perform control so that the data now being transmitted to and received from the multi-RAT MS is seamlessly transmitted from the AP to the neighbor AP.

A method of releasing (or dissociating) the secondary system is described below.

If the multi-RAT MS determines that a channel state with the secondary system now being accessed thereto is not good, the multi-RAT MS performs scanning on neighbor secondary systems. Here, as described above, the scanning can be performed in response to an instruction of the base station, or the multi-RAT MS can perform the scanning autonomously.

If the multi-RAT MS determines that there is no detected secondary system as a result of the scanning into the neighbor secondary systems, the multi-RAT MS dissociates the secondary system now being accessed thereto.

In this case, if data corresponding to a specific flow of the primary system is being transmitted and received through the secondary system and the MS is unable to perform an HO to a neighbor AP secondary system, the base station has to support multi-RAT seamless flow mobility so that seamless flow mobility can be performed without a data loss for the corresponding flow.

Or, in this case, when the multi-RAT MS completes the transmission of data transmitted to and received from the secondary system, the base station can release association with the secondary system.

The re-association (e.g., a handover to a neighbor AP) of the secondary system is described below.

Here, it may be assumed that the re-association of the secondary system, that is, a handover between secondary systems, is performed on only specific association.

Here, the re-association of the secondary system, that is, a handover between the secondary systems, is seamlessly performed through the primary system.

If the multi-RAT MS determines that the channel state of the secondary system now being accessed thereto is not good, the multi-RAT MS or the base station can release association with the secondary system now being accessed thereto and request a handover (HO) to another secondary system.

That is, the base station informs the multi-RAT MS that there is no longer data transmitted and received through a current serving secondary system by sending an SS-CMD message to the multi-RAT MS. Next, the base station instructs the multi-RAT MS to transmit and receive existing transmitted data through the primary system. If the transmission of the existing data is completed, the base station instructs the multi-RAT MS to transmit and receive data to and from a new secondary system. That is, a seamless handover between the secondary systems can be performed through the primary system.

Furthermore, when the multi-RAT MS performs a handover between primary systems, if the coverage of the secondary system is located at the boundary of the primary systems, the multi-RAT MS can perform a handover between the primary systems seamlessly by using the secondary system.

Furthermore, if the multi-RAT MS moves within the primary system, for example, WiMAX coverage at high moving speed, the base station can instruct the multi-RAT MS not to perform association with the secondary system although the multi-RAT MS has entered the coverage of the secondary system. That is, this management of the secondary system can be performed based on the speed of the multi-RAT MS.

The method of performing an access process of a multi-RAT MS to a second system (second base station, AP) in consideration of moving velocity of the multi-RAT MS, according to an embodiment of the present invention, will be described below in more detail.

Using Timer

Figure 6:
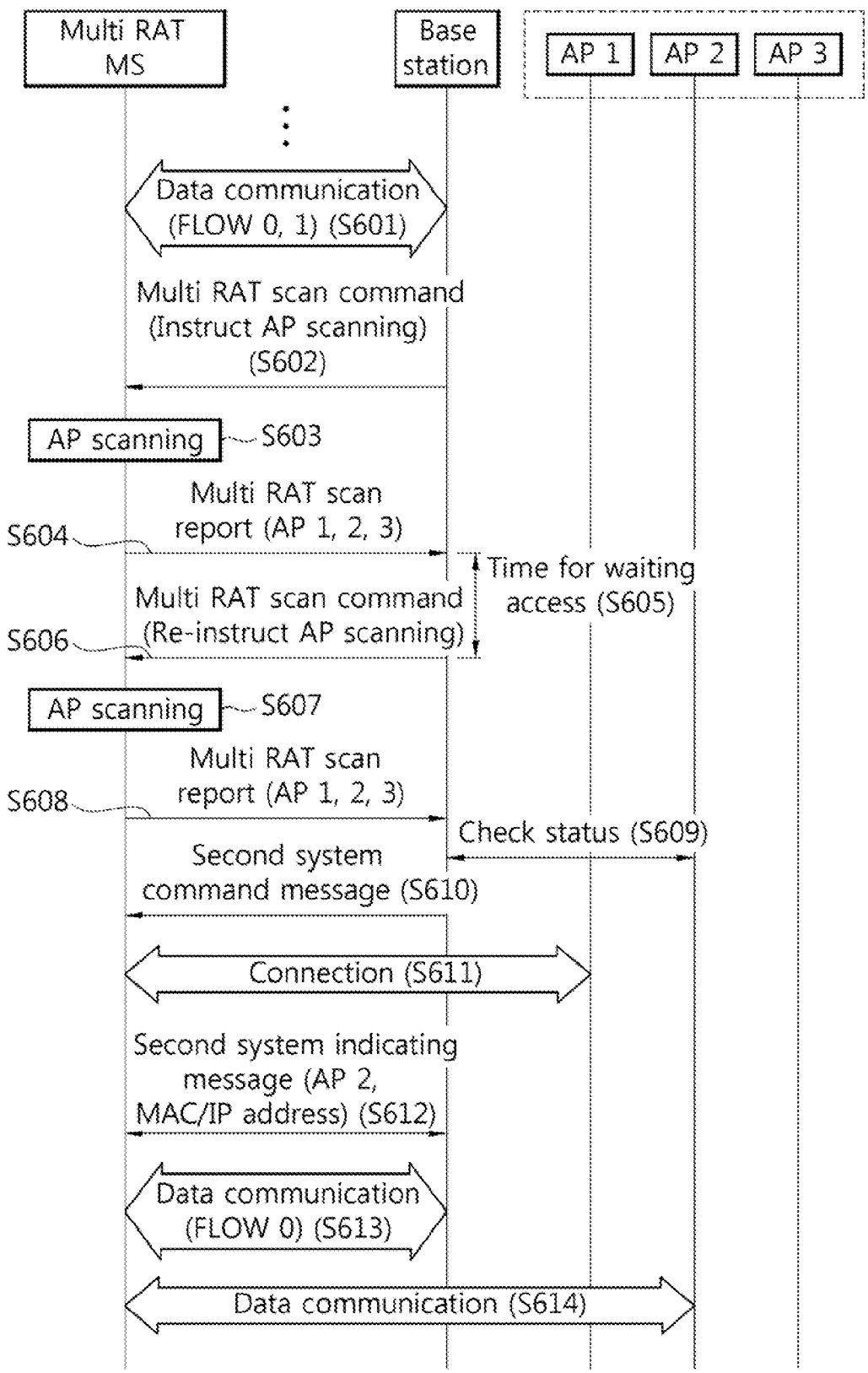
FIG. 6 is a flowchart showing a method for accessing of a multi-RAT MS to an AP by using a timer according to an embodiment of the present invention.

FIG. 6 is a flowchart showing a method for accessing of a multi-RAT MS to an AP by using a timer according to an embodiment of the present invention.

Although not shown in FIG. 6, the multi-RAT MS performs an initial network entry process and a multi RAT capacity negotiation process with the ABS (base station). The multi-RAT MS, through the process, receives from the ABS information on a specific service flow which is necessary for performing communication with the AP.

Referring to FIG. 6, the multi-RAT MS transmits and receives data on service flow 0 and 1 (flow 0, 1) with the ABS (S601).

The process of communication between the multi-RAT MS and the AP on the service flow '1' communicated between the ABS and the multi-RAT MS will be disclosed below.

First, the ABS transmits to the multi-RAT MS a first message instructing performing of scanning on APs (AP 1,2,3) within coverage of the ABS (S602). Here, the first message can be a multi RAT scan command message (Multi-RAT_SCN-CMD).

Then, the multi-RAT MS performs scanning on the APs (AP 1, 2, 3) based on the received first message (S603).

Then, the multi-RAT MS, after performing the scanning, transmits to the ABS a first scan report message indicating a result of scanning on the APs (AP 1, 2, 3) (S604). Here, the first scan report message can be a multi RAT scan report message (MultiRAT_SCN-REP).

Here, the result of scanning means a channel status value on each of the APs.

Then, the ABS selects a specific AP (AP 2) for accessing to the multi-RAT MS on the service flow '1' through the received first scan report message, and the ABS checks whether a specific criteria is fulfilled by the channel status value on the selected specific AP (AP 2).

Here, the specific criteria may be a value required for joining the AP, which can mean the value on parameters related to cell characteristics such as cell channel quality.

Then, the ABS operates a specific timer (SecondarySystemJoin_WaitingTime) when the specific criteria is fulfilled by the channel status of the specific AP (AP 2) (S605). Here, the specific timer can mean specific time for which the multi-RAT MS which waits for accessing to the specific AP (AP 2).

Then, the ABS transmits a second message reinstructing scanning on the APs (AP 1, 2, 3) to the multi-RAT MS when the specific timer expires (S606). Here, the second message can be multi RAT scan command message (MultiRAT_SCN-CMD).

Then, the multi-RAT MS performs scanning on the APs (AP 1, 2, 3) based on the received second message (S607), and transmits to the ABS a second scan report message indicating the result of scanning on the APs (S608). Here, the second scan report message can be multi RAT scan report message (MultiRAT_SCN-REP).

Then, the ABS checks again, based on the second scan report message, whether the specific criteria is fulfilled by the channel status on the specific AP (AP 2) selected in the step next to S604.

If the specific criteria is again fulfilled by the channel status on the specific AP (AP 2) by the result of the checking, the ABS checks a status on the specific AP (AP 2) (S609), and transmits a third message instructing access of the specific AP (AP 2) to the multi-RAT MS (S610).

Here, the third message can be a second system command message (SecondarySystem-CMD).

If the specific AP selected at the step S609 is different from the specific AP selected at the step next to the step S604, the steps of S605-S608 are repeatedly performed on the changed AP.

As described above, the ABS starts the timer which is defined above when the multi-RAT MS fulfills the specific criteria for accessing to the AP, and performs the process of checking whether the AP to be accessed fulfils the specific criteria when the timer expires.

In other words, as in the previous cases, the ABS transmits to multi-RAT MS a second system command message (SS-CMD) instructing access to the AP only when the AP fulfils the specific criteria, thereby performing process of accessing between the multi-RAT MS and the AP.

Then, the multi-RAT MS accesses to the specific AP (AP 2) (performs the process of connection) based on the received third message (S611).

Then, the multi-RAT MS transmits second system indication message (SecondarySystem-IND) to the ABS indicating access to the specific AP (AP B2) has been successful (S612). Here, the second system indication message includes an MAC address of the multi-RAT MS and IP address of the connected AP (AP 2).

Then, the multi-RAT MS transmits and receives data simultaneously with the ABS and AP 2 (S613, S614). In other words, as shown in FIG. 6, the multi-RAT MS communicates the data on service flow '0' (flow 0) with ABS (S613), and the data on service flow '1' (flow 1) with AP 2 (S614).

Using Average Channel Status Value on AP

Figure 7:
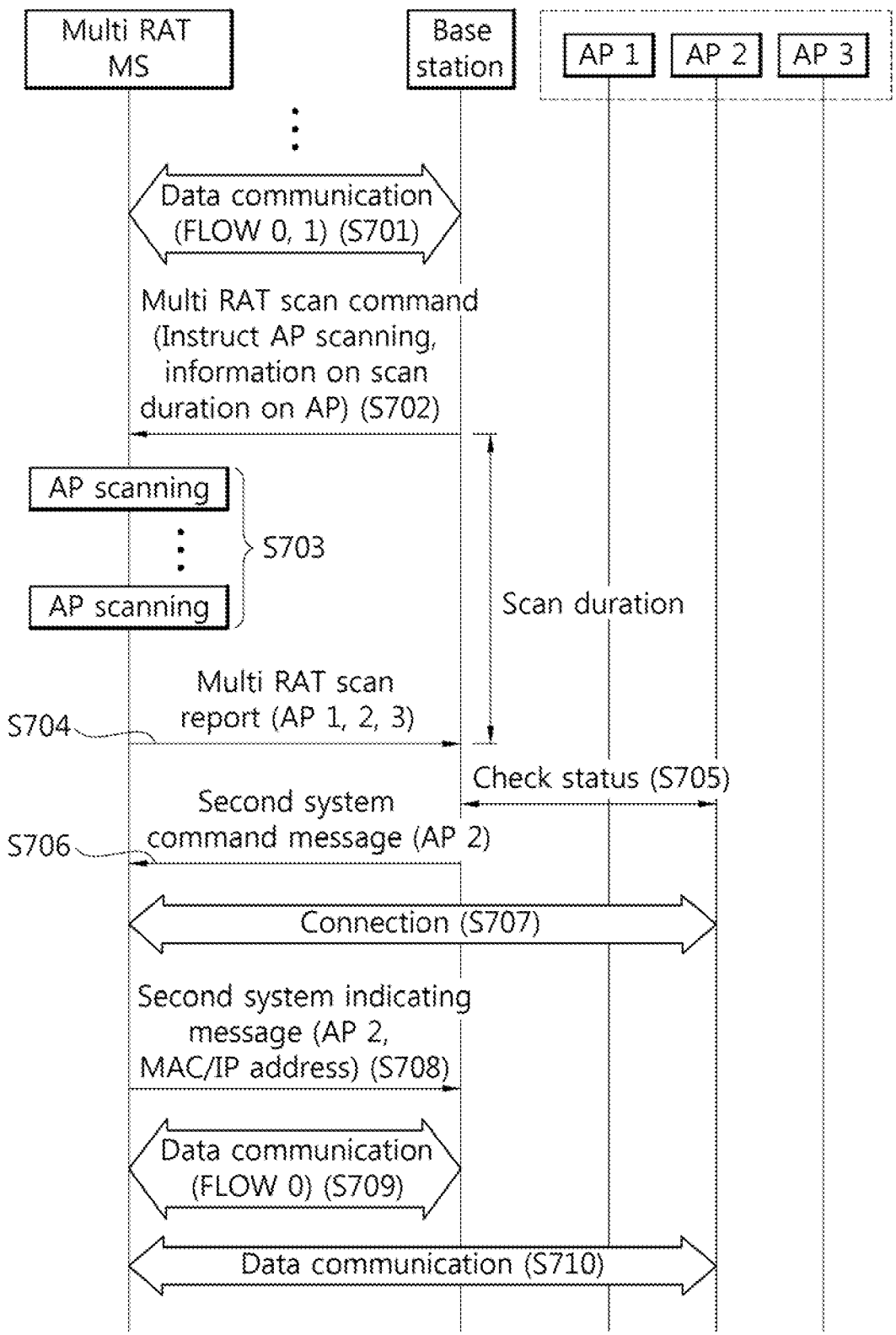
FIG. 7 is a flowchart showing a method of performing communication between a multi-RAT MS and an AP by using an average channel status value on AP during scan duration according to an embodiment of the present invention.a FIG. 8 is a block diagram showing internal structures of an MS and a BS in a wireless access system according to an embodiment of the present invention.

FIG. 7 is a flowchart showing a method of performing communication between a multi-RAT MS and an AP by using an average channel status value on AP during scan duration according to an embodiment of the present invention.

Referring to FIG. 7, the multi-RAT MS transmits and receives data on service flow 0 and 1 (flow 0, 1) with the ABS (S701).

Then, the multi-RAT MS receives a multi RAT scan command message (MultiRAT_SCN-CMD) instructing scanning on the APs (AP 1, 2, 3) within coverage of the ABS from the ABS (S702). Here, the multi RAT scan command message includes scan duration information (SS_scan_duration) indicating minimum time for performing the scanning (or measuring the value of channel status) on the APs (AP 1, 2, 3).

Here, as for the scan duration information, different values can be transmitted for each AP depending on the characteristics of the APs (e.g., coverage), or unified (or identical) value for the APs can be transmitted.

Then, the multi-RAT MS performs scanning on the AP according to the scan duration information (S703).

In other words, the multi-RAT MS measures channel status on the AP for the scan duration, and calculates an average value of the measured channel status values.

Here, the channel status value can be a carrier to interference ration (CINR) or a received signal strength Indication (RSSI).

Then, the multi-RAT MS transmits the calculated average value, i.e., multi RAT scan report message including the average value of the channel status values to the ABS (S704).

Then, the ABS determines access to the specific AP (AP 2) based on the received multi RAT scan report message, when the average value of channel status values on the specific AP (AP 2) fulfills the specific criteria defined in FIG. 6.

Here, the process of determining the specific criteria and access to the specific AP (AP 2) can be performed by applying the steps S605-S608 of FIG. 6.

Then, the ABS selects the specific AP (AP 2), and performs the process of checking the status of the specific AP (AP 2) selected (S705).

Then, the ABS transmits second system command message (SecondarySystem-CMD) instructing access to the selected specific AP (AP 2) to the multi-RAT MS (S706).

The processes of the steps S707-S710 is the same as those of the steps S611-S614 shown in FIG. 6, and will be referred to FIG. 6 for detailed description.

The embodiment of the present invention and their modifications can be combined. Therefore, each embodiment can be implemented in combination as well as in its own. These combinations may be obvious to those skilled in the art from the description of the specification, and so detailed description thereof is omitted. Although the description on the combination has not been included in the specification, those combinations of embodiments shall be interpreted to be within the scope of the present invention.

The above-described embodiments and modifications may be made by various means, for example, in hardware, firmware, software, or in a combination thereof.

When implemented in hardware, the methods according to the embodiments of the present invention may be embodied by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

When implemented in firmware or software, the methods according to the embodiments of the present invention may be embodied in modules, procedures or functions that perform the above-described functions or operations. The software codes may be stored in a memory unit and driven by a processor. The memory unit may be positioned in or outside of the processor and may transmit or receive data to/from the processor by various known means.

For example, the methods according to the embodiments of the present invention may be stored in a storage medium (for example, an internal memory, a flash memory, a hard disk, etc.) and may be implemented as codes or commands in a software program that may be executed by a processor (for example, a microprocessor). This will be described with reference to FIG. 7.

FIG. 8 is a block diagram showing internal structures of an MS and a BS in a wireless access system according to an embodiment of the present invention.

An MS 10 includes a controller 11, a memory 12, and a radio frequency (RF) unit 13.

The MS 10 can be fixed or mobile and can be called another terminology, such as user equipment (UE), a user terminal (UT), a subscriber station (SS), a wireless device, or an advanced mobile station (AMS). Furthermore, the MS includes the multi-RAT MS.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20, 30 includes a controller 21, a memory 22, and an RF unit 23.

Here, the base station 20, 30 commonly refers to a fixed station communicating with the MS, and the base station can be called another terminology, such as a NodeB, a base transceiver system (BTS), or an access point. One or more cell can be present in one base station.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

What is claimed is:

1. A method for a terminal to transmit and receive data with first base stations supporting a first radio access technology (RAT) and second base stations supporting a second RAT in a wireless access system supporting multi-RAT, the method performed by the terminal and comprising:

transmitting and receiving data with one first base BS;

performing a first scanning on at least one second BS;

transmitting a first scan report message to the one first BS, the first scan report message indicating a result of the first scanning and the channel status value for the at least one second BS, wherein a timer is started after the first scan report message is received by the one first BS and the channel status value satisfies a specific criteria, the timer indicating a time for which the terminal waits for access to the at least one second BS;

receiving a first message from the one first BS after expiration of the timer, the first message reinstructing scanning on the at least one second BS;

performing a second scanning on the at least one second BS upon receiving the first message;

transmitting a second first scan report message to the one first BS indicating a result of the second scanning;

receiving a second message from the one first BS instructing access to one of the at least one second BS;

performing an access procedure to the one of the at least one second BS according to the received second message; and transmitting and receiving data with the one of the least one second BS connected via the access procedure.

2. The method of claim 1, wherein the second message is received from the one first BS if the channel status value for the at least one second BS satisfies the specific criteria again.

3. The method of claim 1, wherein performing the first scanning comprises determining an average of measured channel status values of the at least one second BS.

4. The method of claim 3, wherein a result of the first scanning is the determined average.

5. The method of claim 1, wherein the first message is a multi RAT scan command (MultiRAT_SCN-CMD) message.

6. A method for a first base station (BS) to transmit and receive data with a terminal supporting a first radio access technology (RAT) and second base stations supporting a second RAT in a wireless access system supporting multi-RAT, the method performed by the first BS and comprising:

transmitting and receiving data with the terminal;

transmitting a first message to the terminal instructing a first scanning on at least one second BS covered by the first BS;

receiving a first scan report message from the terminal, the first scan report message indicating a result of a first scanning on the at least one second base station and a channel status value for the at least one second BS;

starting a timer when the channel status value satisfies a specific criteria, the time indicating a time for which the terminal waits for access to the at least one second BS;

transmitting a second message to the terminal after expiration of the timer, the second message reinstructing scanning on the at least one second BS;

receiving a second scan report message from the terminal indicating a result of a second scanning on the at least one second BS; and transmitting a third message to the terminal instructing access to one of the at least one second BS.

7. The method of claim 6, wherein the third message is transmitted if the channel status value for the at least one second BS satisfies the specific criteria again.

8. A terminal for transmitting and receiving data with first base stations supporting a first radio access technology (RAT) and second base stations supporting a second RAT in a wireless access system supporting multi-RAT, the terminal comprising:

a radio communication unit for transmitting and receiving a radio signal with an external device; and a controlling unit connected to the radio communication unit and configured for:

transmitting and receiving data with one first BS;

performing a first scanning one at least one second BS;

transmitting a first scan report message to the one first BS, the first scan report message indicating a result of the first scanning and a channel status value for the at least one second BS, wherein a timer is started after the first scan report message is received by the one first BS and the channel status value satisfies a specific criteria, the timer indicating a time for which the terminal waits for access to the at least one second BS;

receiving a first message from the one first BS after expiration of the timer, the first message reinstructing scanning on the at least one second BS;

performing a second scanning on the at least one second BS upon receiving the first message;

transmitting a second scan report message to the one first BS indicating a result of the second scanning;

receiving a second message from the one first BS instructing access to one of the at least one second BS;

performing an access procedure to the one of the at least one second BS according to the received second message; and transmitting and receiving data with the one of the at least one second BS connected via the access procedure.

* * * * *